(12) United States Patent
Ozawa

(10) Patent No.: US 6,323,608 B1
(45) Date of Patent: Nov. 27, 2001

(54) DUAL VOLTAGE BATTERY FOR A MOTOR VEHICLE

(75) Inventor: Koichiro Ozawa, Rancho Palos Verdes, CA (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/653,289

(22) Filed: Aug. 31, 2000

(51) Int. Cl.$^7$ .................................. H02P 3/00; H02J 7/16
(52) U.S. Cl. ............................................ 318/139; 320/140
(58) Field of Search ...................... 318/139, 375, 318/376; 320/116, 119, 123, 140; 363/15, 132

(56) References Cited

U.S. PATENT DOCUMENTS

| | | |
|---|---|---|
| 3,667,025 * | 5/1972 | Campbell et al. .................. 320/140 |
| 4,723,105 | 2/1988 | Matouka et al. . |
| 5,166,538 | 11/1992 | Norton . |
| 5,350,994 | 9/1994 | Kinoshita et al. . |
| 5,710,699 * | 1/1998 | King et al. ............................ 363/132 |
| 5,898,282 | 4/1999 | Drozdz et al. . |

* cited by examiner

Primary Examiner—Khanh Dang
(74) Attorney, Agent, or Firm—Rankin, Hill, Porter & Clark LLP

(57) ABSTRACT

A single dual-voltage battery capable of powering an automobile system having electrical equipment that requires different supply voltage. The battery allows idle stop, assisted drive and regeneration to be performed more efficiently by cooperative control of a controller and a DC/DC converter. Commonly performed external powering and starting can also be carried out if the battery has expired. The single dual-voltage battery is obtained by equipping a 12-V battery with a 24-V battery of a different type and adapted to supply power to respective electrical components. The 12-V battery unit is provided with a charging controllable DC/DC converter or downverter. The ancillary battery condition is monitored and controlled. External powering and starting is facilitated by using an ultracapacitor as the ancillary battery. The battery can be used with a single relay.

17 Claims, 5 Drawing Sheets

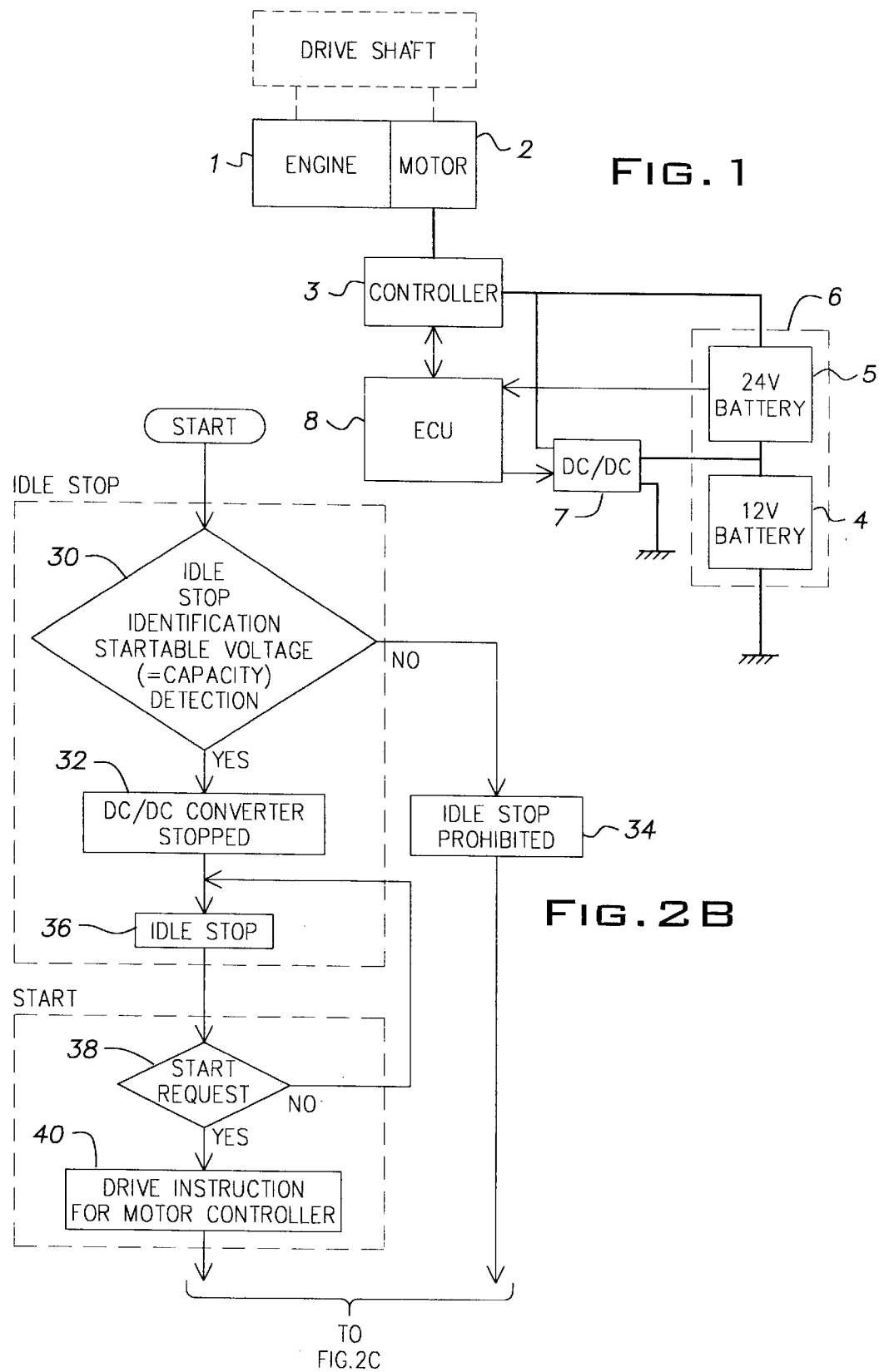

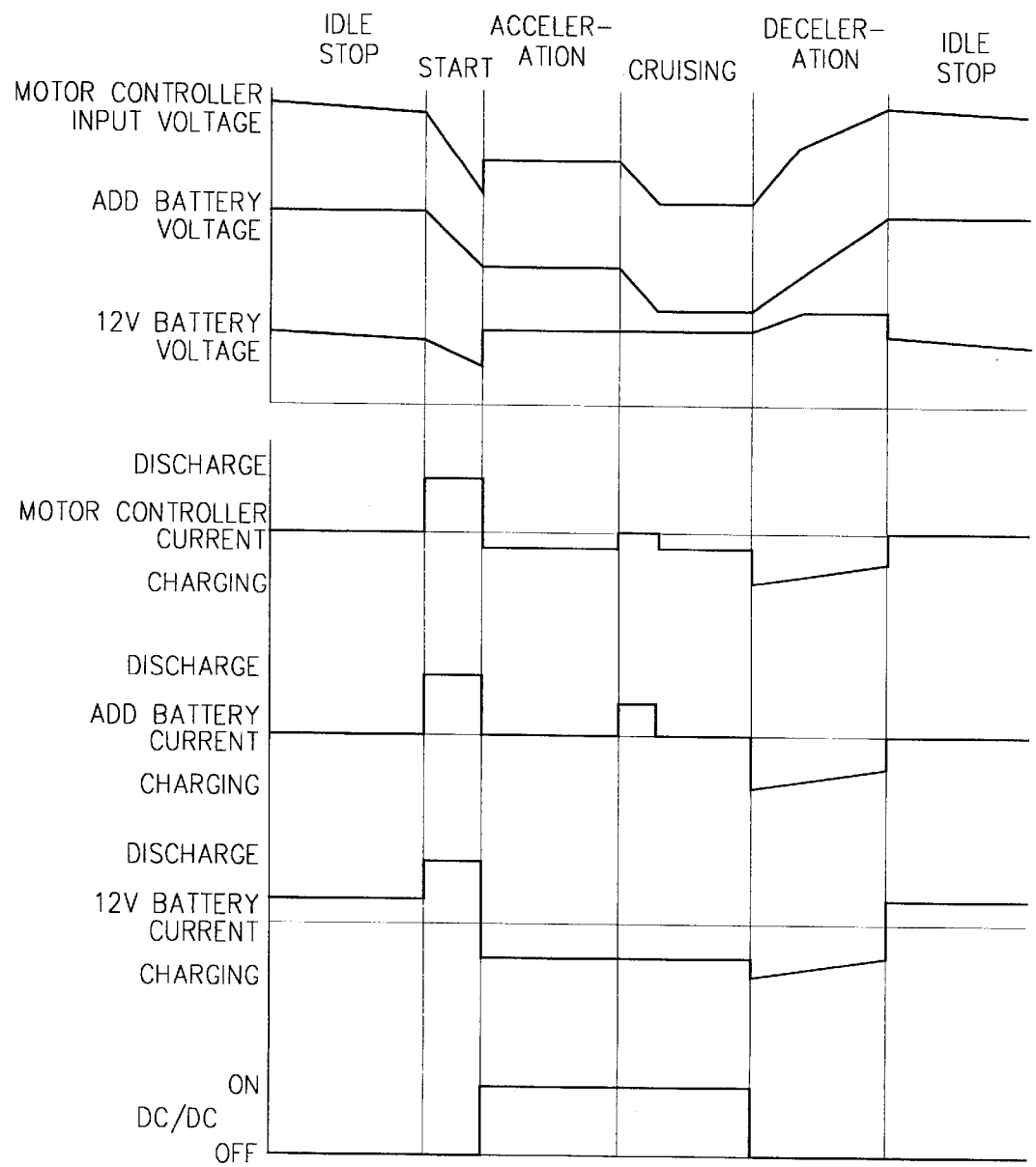

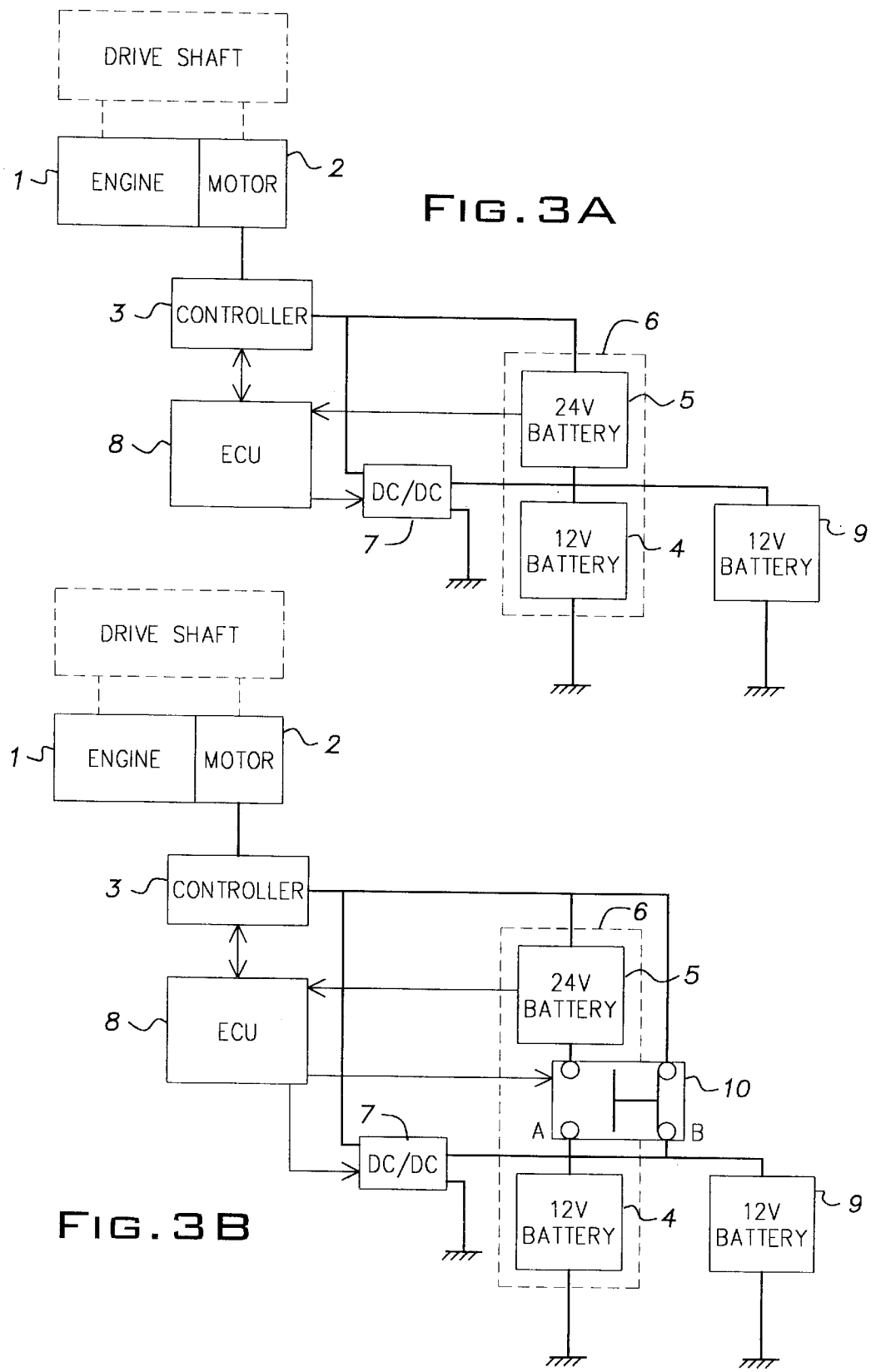

DUAL VOLTAGE BATTERY FOR A MOTOR VEHICLE

BACKGROUND OF THE INVENTION

The present invention generally relates to a drive device for a vehicle having an engine and a motor and, more particularly, to such a drive device that is equipped with a single battery capable of supplying two types of power.

In conventional practice, additional batteries are provided to idle stop devices (drive devices) that require a main supply voltage (referred to as a 36-V battery hereinbelow) above that of a 12-V battery for common electrical equipment. A 14-V stator or a bi-directional DC/DC converter is preferably also provided to permit jump-starting of the equipment from the outside with a separate 12-V battery when the 36-V battery has deteriorated or expired.

The above-described conventional arrangement can be made to function by retaining the existing starter technology and mounting new batteries and idle stop starters. However, it is impossible to save space or reduce weight by retaining the existing 12-V system. Accordingly, manufacturing expense and product costs are increased because the system can only be installed on a limited number of car models.

SUMMARY OF THE INVENTION

The present invention is directed toward managing battery energy in an optimal manner by employing a novel battery operating procedure. The present invention is further directed toward a method for controlling a motor controller and a DC/DC converter in a coordinated manner to provide an idle stop function, and to achieve better fuel economy with a compact system.

In accordance with the one aspect of the present invention, a main battery is provided for driving a vehicle drive device equipped with an engine and with a motor linked to the engine drive shaft. The main battery includes a 12-V battery for common electrical equipment and a low-capacity or ancillary battery of a different type. The low-capacity battery may be an ultracapacitor, a lithium battery, a nickel battery, a high-output lead battery, or any other advanced battery.

In operation of the vehicle incorporating the present invention, the motor may function as a generator. However, the 12-V battery unit must still supply power to the common electrical equipment on a constant basis. Therefore, a DC/DC converter is connected between the motor (generator) and the 12-V battery via a separate charging route to avoid disrupting the charge-discharge balance. The capacity of the 12-V battery unit can be reduced by varying the rating of the DC/DC converter.

The present invention is further directed toward a method for more efficiently using energy. In accordance with the inventive method, a state of operation of the vehicle (idle stop, start, acceleration, cruising, and deceleration) is determined. As a result of the determined state of vehicle operation, the set voltage of the motor controller and the mode of the DC/DC converter is switched, making it possible to control the battery condition in an optimal manner.

An engine cannot be started if the car battery voltage has deteriorated or if the battery has been completely discharged as a result of neglect. The urgent measures undertaken in such cases include procuring a new battery or obtaining power from another vehicle. Existing vehicle batteries have a voltage of 12-V, and are therefore not useful to jump-start conventional automobiles incorporating a 36-V battery system. With the battery of the present invention, external starting from a 12-V power supply can be performed when an ultracapacitor with physically reversible poles is used as the ancillary battery. On the other hand, when the ancillary battery is one whose poles cannot be reversed, a single switch can be provided between the 12-V battery and the ancillary battery to control these batteries.

The present invention dispenses with the need for an existing separate 12-V system and provides a compact, lightweight system. The present invention also permits optimal battery management by cooperative control of the motor controller and DC/DC converter, thereby improving the idle stop function and fuel economy.

BRIEF DESCRIPTION OF THE DRAWINGS

These and further features of the present invention will be apparent with reference to the following description and drawings, wherein:

FIG. 1 is a block diagram of a vehicle drive system pertaining to a first embodiment of the present invention;

FIG. 2A schematically illustrates operation of the first embodiment of FIG. 1;

FIGS. 2B and 2C are a control flow chart of the first embodiment;

FIG. 3A is a block diagram of a first embodiment of an external powering and starting systems according to the present invention;

FIG. 3B is a block diagram of a second embodiment of an external powering and starting systems according to the present invention.

DETAILED DESCRIPTION OF THE PREFERRED EMBODIMENTS

Figure 2C:
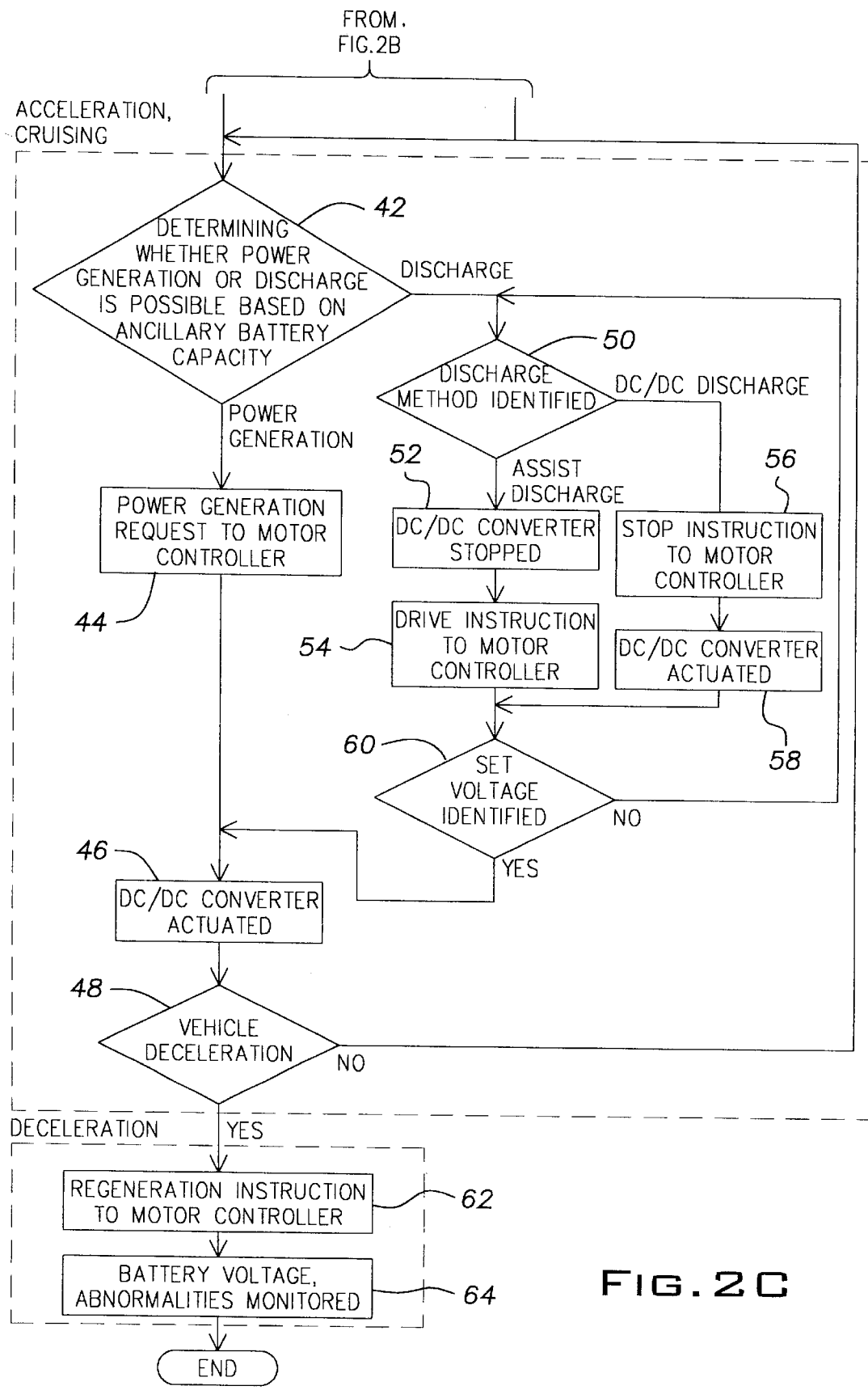

With reference to FIG. 1, a vehicle drive system according to the present invention is illustrated. The drive system includes a vehicle engine 1, a motor/generator 2, a controller 3 for controlling the flow of electricity between a main battery 6 and the motor/generator. The main battery 6 includes a 12-V battery 4 and a low-capacity 24-V battery 5, which is referred to hereinafter as the ancillary or additional battery. The engine 1 and motor 2 are preferably connected to a common engine drive shaft. The motor 2 has start, assisted drive, power generation, and regeneration functions.

The main battery 6 is a dual-voltage battery, and is adapted to provide 12-V power, via the 12-V battery 4, or 36-V power. The 12-V battery 4 serves as part of the main battery 6 for powering the motor and serves as a power supply for common electrical equipment (i.e., radio, lights, fuel injection, fuel pump, etc.). The ancillary battery 5 constitutes the other part of the main battery 6. As will be described more fully hereinafter, the ancillary battery 5 is used either alone, to recharge the 12-V battery 4 or to power the motor 2, or is used in combination with the 12-V battery to power the motor 2, as will be described more fully hereinafter.

A DC/DC converter 7 is provided to control the supply of power to the 12-V battery 4. An electronic control unit or ECU 8 is provided for switching the DC/DC converter 7 on and off and for causing the controller 3 to operate in a drive, regeneration, or power generation mode (current, voltage). The arrows in the drawing indicate signal lines. Generally, the DC/DC converter is operable to control recharging of the 12-V battery via the motor controller 3 or from the ancillary battery 5.

With reference to FIGS. 2A–2D, operation of the first embodiment is illustrated and a control flow chart thereof is provided. In FIG. 2A, six separate modes are illustrated: (from left to right) idle stop, start, acceleration, cruising, deceleration, and idle stop are provided. Each of these columns represent different operating conditions or modes of the vehicle drive system, (i.e., motor/generator) and will be described hereinafter. Although these modes of operation are shown sequentially, it is considered apparent that they occur in different orders and will, in practice, typically vacillate between acceleration/cruise/deceleration.

With reference to FIG. 2B, it is noted that, before the idle stop is performed, the ECU 8 checks the ancillary battery 5 for its capacity and possible abnormalities (step 30). The ECU 8 stops the DC/DC converter (step 32) and implements the idle stop (step 36) after confirming that restarting is possible. If capacity problems or other abnormalities exist, idle stop is prohibited (step 34), and control moves to the acceleration/cruise section (FIG. 2C).

Next, upon generation of a start request (step 38), the ECU gives a drive instruction (step 40) to the motor controller 3. Therefore, the motor 2 is driven by the main battery 6.

Thereafter, with reference to FIG. 2C, during acceleration/cruising, it is determined whether power generation or discharge is to be performed based upon the capacity of the ancillary battery 5 (step 42). If the ECU 8 determines, based upon the ancillary battery capacity, that power generation is required, a power generation request (step 44) is given by the ECU 8 to the motor controller 3, and the DC/DC converter 7 is actuated (step 46). Thus, the battery 6 is thus charged by the DC/DC converter 7. Thereafter, the system is monitored for vehicle deceleration (step 48).

If, in step 42, the ECU determines that discharge of the ancillary battery is required, the ECU then determines, based upon the operating state of the system and the condition of the batteries, how discharge is to be performed (step 50). Discharge may be accomplished by either power assist discharge, wherein the battery is used to power the motor, or DC/DC converter discharge, wherein the ancillary battery is used to charge the 12-V battery.

During power assist discharge, the DC/DC converter 7 is stopped or off (step 52) and a drive instruction is given to the motor controller (step 54) such that the motor is powered by the main battery. During DC/DC discharge, a stop instruction is given to the motor controller (wherein the motor is not powered by the main battery 6—step 56), and the DC/DC converter 7 is actuated (step 58) such that the 12-V battery 4 is charged by the ancillary battery 5. In either case, the ancillary battery voltage is monitored (step 60) and, if the ancillary battery 5 is at the desired voltage, control returns to the power generation/discharge loop, the DC/DC converter 7 is actuated so that the 12-V battery is charged by the motor 2 via the controller 3, and the vehicle is monitored for deceleration. Otherwise, control returns to step 50 wherein the battery discharge method is again determined.

If in step 48 it is determined that the vehicle is decelerating, the motor controller is instructed by the ECU 8 to regenerate power, and thereby recharge the battery 6 (step 62). The battery 6 is monitored for voltage and abnormalities (step 64) and, assuming that the battery voltage is within predetermined limits, and no abnormalities exist, then the idle stop mode can be initiated upon request (i.e., step 30).

Various operating parameters during the above-described modes of operation are illustrated in FIG. 2A. First, during idle stop, the engine 1 is stopped. The input voltage to the motor controller 3, which is directly related to the main battery voltage (combination of the 12-V battery and ancillary battery), falls slowly. The ancillary battery voltage remains constant. The 12-V battery 4, which supplies power to the conventional electrical equipment, is discharging, so its voltage falls slowly. The DC/DC converter 7 is off.

During starting, the motor controller 3 is driven by the main battery 6. The ancillary battery 5 and the 12-V battery 4 are discharging, so their voltages fall. The motor controller is discharging or supplying current to drive the motor 2. The DC/DC converter 7 remains off.

During acceleration, the DC/DC converter 7 is turned on, the motor controller 3 is supplying charging current from the motor 2 to the 12-V battery via the DC/DC converter 7, thereby recharging the 12-V battery 4. Thus, the voltage of the 12-V battery 4 increases and stabilizes. The voltage at the ancillary battery 5 and the motor controller 3 also stabilize, but at a lower level than during idle stop. Thus, the ECU 8 does not require the motor controller 3 to generate power immediately after starting.

Figure 2D:
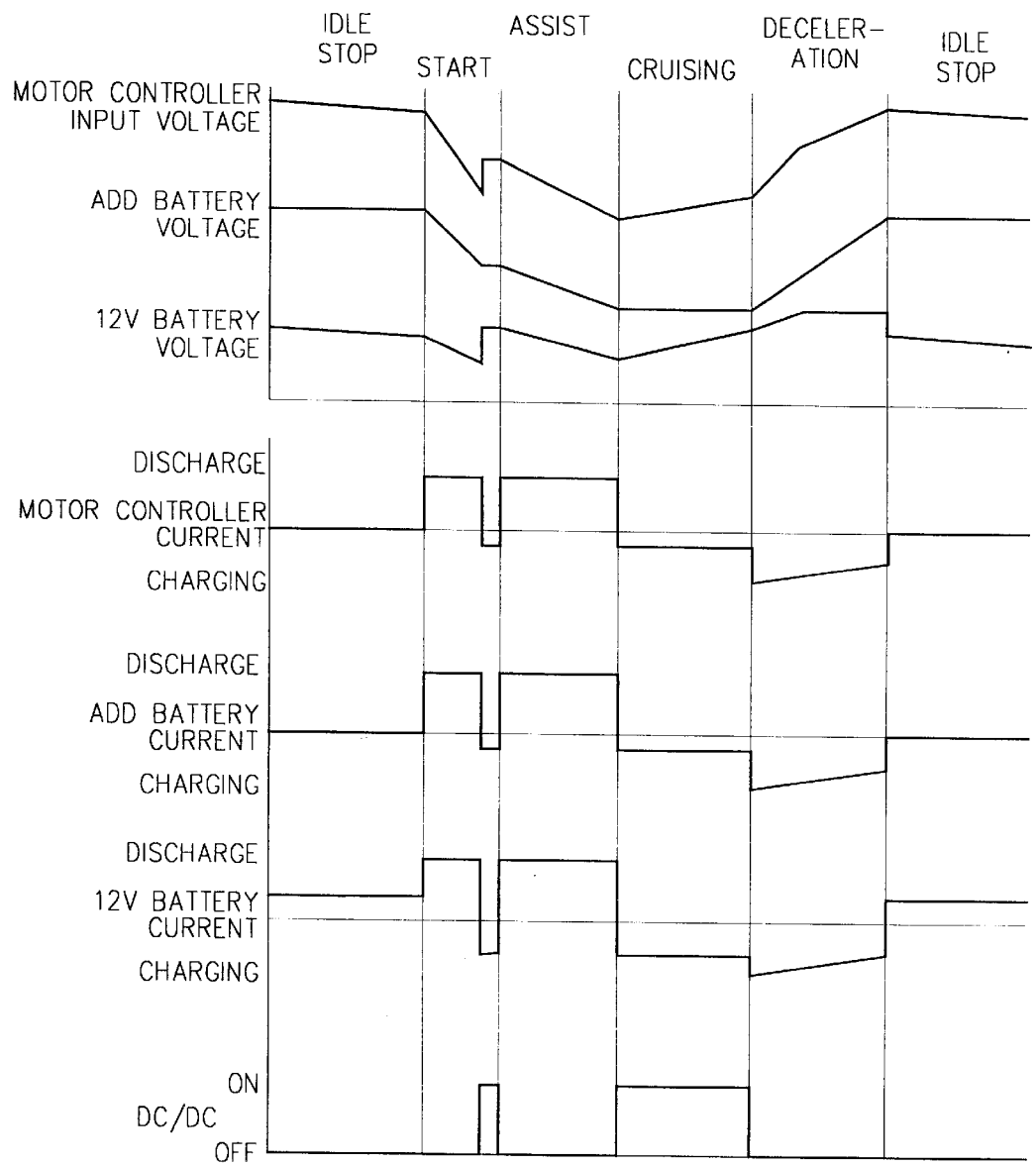
FIG. 2D is similar to FIG. 2A, but shows operation in an assist-discharge mode.

Depending on the condition of the batteries 5 and 6, the motor controller 3 is further instructed to assist in the driving of the motor 2 during subsequent acceleration and, in this case (known as assisted drive), the DC/DC converter 7 is not operated. FIG. 2A illustrates the situation in which assisted drive is not performed. FIG. 2D, to be described hereinafter, illustrates operating parameters when assisted drive is performed.

During cruising the ECU 8 controls the battery 5 such that regeneration energy remains at a recoverable set volume (capacity). In other words, the ancillary battery voltage is first discharged to a desired undercharged level and then maintained at the desired undercharged level. Discharge of the ancillary battery 5 is accomplished by turning the motor controller off and supplying current from the ancillary battery to the 12-V battery via the DC/DC converter. When the ancillary battery 5 voltage reaches the desired undercharged level, the motor controller 3 returns to charging mode to charge the 12-V battery 4 via the DC/DC converter 7. It is noted that the 12-V battery voltage remains substantially constant during this time. The undercharged level of the ancillary battery 5 is the level that the ancillary battery may be recharged to the required starting voltage during operation in a subsequent deceleration or power generation mode.

As a result of the aforementioned process, energy is efficiently utilized, and the ancillary battery 5 is discharged to a predetermined voltage. After the ancillary battery is discharged, the power generation function is enabled, and energy is supplied to the 12-V battery via the motor controller 3 and the DC/DC converter 7.

During deceleration, the main battery 6 (i.e., the ancillary battery 5 and 12-V battery 4) is charged with recovered energy via the motor controller 3. The main battery 6 is charged by motor power generation until the stored energy is sufficient for starting, and the system may be moved to an idle stop thereafter. The DC/DC converter 7 is off during deceleration.

The parameters illustrated in FIG. 2D are similar, in some respects, to those of FIG. 2A, but specifically show an assist discharge in place of an acceleration mode. First, during idle stop, the engine 1 is stopped. The input voltage to the motor controller 3, which is directly related to the main battery voltage (combination of the 12-V battery and ancillary battery), falls slowly. The ancillary battery voltage remains constant. The 12-V battery 4, which supplies power to the conventional electrical equipment, is discharging, so its voltage falls slowly. The DC/DC converter 7 is off.

During starting, the motor controller 3 is driven by the main battery 6. The ancillary battery 5 and the 12-V battery 4 are discharging, so their voltages fall. The motor controller is discharging or supplying current to drive the motor 2. The DC/DC converter 7 remains off until the end of the starting mode, wherein the DC/DC converter is turned on. Power from the motor 2, via the motor controller, is supplied to recharge the 12-V battery 4.

Next, during the assist discharge mode, the DC/DC converter 7 is turned off, the motor controller 3 is discharging or supplying current from the main battery 6 to the motor 2, and the main battery 6 voltage falls. The end of the assist discharge mode occurs when the ancillary battery 5 is at the predetermined undercharged level. When this occurs (i.e., cruising mode), the DC/DC converter 7 turns on, and the 12-V battery 4 is recharged with power from the motor 2 and motor controller 3 via the DC/DC converter 7. Thus, the voltage of the 12-V battery 4 increases. The ancillary battery 5 is maintained at the predetermined undercharged level.

During deceleration, the main battery 6 (i.e., ancillary battery 5 and 12-V battery) is charged with recovered energy via the motor controller 3. The main battery 6 is charged by motor power generation until the stored energy is sufficient for starting, and the system may be moved to an idle stop thereafter. The DC/DC converter 7 is off during deceleration.

In accordance with the present invention, if the ancillary battery 5 is overcharged, the ancillary battery 5 can be preserved without altering the vehicle design. This is accomplished by using the same type of control during cruising as used during discharge to reduce or dissipate the charge on the battery. By adopting this approach, discharge of the ancillary battery is carried out during cruising. If the ancillary battery 5 has broken down completely, the power generated by the motor can be supplied to the DC/DC converter 7 alone by continuing to superpose the voltage of the motor controller 3 on the voltage of the main battery 6. The battery 4, which is designed to maintain normal operation of the vehicle, can thus provide an uninterrupted energy supply.

With reference to FIGS. 3A and 3B, block diagrams of external powering and starting systems according to the present invention are provided. The drawings illustrate a situation in which 12-V power can be supplied externally from a separate battery or another vehicle when the main battery 6 has deteriorated or expired.

FIG. 3A illustrates a connection method in which the ancillary battery 5 is made into a battery capable of operating as an ultracapacitor. FIG. 3A illustrates the situation wherein power from the main battery 6 is unavailable, the discharge voltage of the battery 4 is 10 V or lower, or the ancillary battery 5 (in this case, an ultracapacitor) is close to 0 V. In this situation, connecting an external battery 9 in parallel to the battery 4 allows the ancillary battery 5 to reverse its polarity, a current to flow from the external battery 9, and power to be supplied to the motor controller 3.

FIG. 3B illustrates a connection method wherein the ancillary battery 5 is a common battery damaged by a deep discharge. In this case, the system includes a switch 10, and the ordinary control routine is changed. In the initial state, the B-side of the switch 10 is closed. No power is supplied if the ECU 8 sends a start instruction when the main battery 6 is in a normal state and the external battery 9 is not connected. In this case, the ECU 8 can confirm that the external battery is not connected. The ECU 8 subsequently causes the switch 10 to close on the A-side and issues a restart instruction. There is also a method in which the voltage of the ancillary battery 5 is identified, the capacity is confirmed as being sufficient for power supply, and the switch 10 is closed on the A-side.

Starting is subsequently initiated by the initial start instruction when the external battery 9 is connected. The ECU 8 switches the switch 10 to the A-side after identifying the external battery 9 and confirming an engine start. The system can thus continue functioning normally even if the external battery 9 is disconnected.

What is claimed is:

1. A vehicle drive system comprising:
   an engine;
   an engine drive shaft driven by said engine and a motor;
   a first controller operatively associated with said motor to operate said motor in one of a drive, regenerating, or power generating mode;
   a main battery supplying voltage to said motor to drive said motor, said main battery having a first power supply supplying a first voltage and a second power supply supplying a second voltage for an electrical load, said second voltage being of a lower value than said first voltage;
   a DC/DC converter connected between said second power supply and said first controller, said DC/DC converter controlling the voltage supplied to said second power supply such that said second power supply supplies said second voltage for said electrical load constantly; and
   a second controller connected to said DC/DC converter, said second controller switching on or off the DC/DC converter and causing said first controller to operate said motor in one of said drive, regeneration, or power generation mode.

2. The vehicle drive system of claim 1, wherein said second controller switches off said DC/DC converter and allows said first controller to operate said motor in a regeneration mode to charge said main battery and said DC/DC converter upon said second controller determining that said vehicle is at an idle stop condition.

3. The vehicle drive system of claim 2 wherein said second controller switches off said DC/DC converter and allows said motor controller to operate said motor in a drive mode to drive said drive shaft of said engine upon said second controller determining that said vehicle is in a high load driving condition.

4. The vehicle drive system of claim 3 wherein said second controller switches on said DC/DC converter and allows said first controller to operate said motor in a power generation mode to charge said main battery at a voltage of a predetermine value upon said second controller determining that the vehicle is in a low load driving condition.

5. The vehicle drive system of claim 3 wherein said second controller switches on said DC/DC converter to allow the first power supply to supply voltage to said second power supply upon determining that said main battery is being discharged.

6. The vehicle drive system of claim 3 wherein said second controller switches on said DC/DC converter to allow the first power supply to supply voltage to said second power supply upon determining that said first power supply is overcharged.

7. The vehicle drive system of claim 3 wherein said second controller switches on said DC/DC converter and allows said first controller to operate said motor in a power generation mode to supply voltage to said second power supply upon said second controller determining that said first power supply is not supplying voltage to said motor vehicle.

8. The system of claim 1 including an external battery connected to said second power supply such that said first power supply has its polarities reversed to allow current to flow from said external battery to said motor vehicle.

9. The system of claim 1 including an external battery connected to said DC/DC converter to supply voltage to said first controller;
- a switch connected between said external battery and said second controller;
- said switch having an open position disconnecting said external battery with said DC/DC converter and a closed position connecting said external battery to said DC/DC converter; and
- said switch being in a closed position upon said second controller detecting a voltage of a predetermined value from said main battery.

10. The system of claim 9 wherein said switch is in a closed position upon said second controller detecting a voltage of a predetermined value from said first power supply of said main battery.

11. A method for managing battery energy for a main battery of a motor vehicle, said vehicle including an engine having a drive shaft, a motor connected to said drive shaft, a first controller operatively associated with said motor to operate said motor in one of a drive, regenerating, or power generating mode, said main battery being operable to supply electrical energy to said motor to power said motor and permit said motor to drive said drive shaft, said main battery having a first power supply supplying a first voltage and a second power supply supplying a second voltage, said second voltage being of a lower value than said first voltage, said method comprising the steps of:
- determining that the motor vehicle is in an idle stop condition;
- charging said main battery upon determining said vehicle is in said idle stop condition;
- determining that the motor vehicle is in a starting condition;
- operating said motor to assist in driving said motor vehicle upon determining that the motor vehicle is in a high load driving condition;
- monitoring said voltage of said battery;
- operating said motor in a power generating mode upon determining that the voltage of said battery is below a predetermine value;
- determining that the motor vehicle is in a low load driving condition; and
- operating said motor in a regenerating mode upon determining that the motor vehicle is in a low load driving condition.

12. The method of claim 11 including, the step of discharging said battery upon determining that the voltage of said battery is not below a predetermine value.

13. The method of claim 12 including the step of supplying voltage to said second power supply from said first power supply.

14. The method of claim 11 including the step of determining that said first power supply is not supplying voltage and supplying voltage to said second power supply upon determining said first power supply is not supplying voltage.

15. A vehicle drive system comprising:
- an engine having a drive shaft;
- a motor connected to said drive shaft;
- a first controlling means operatively associated with said motor to operate said motor in one of a drive, regenerating, or power generating mode;
- a main battery supplying voltage to said motor to drive said drive shaft, said main battery having a first power supply supplying a first voltage and a second power supply supplying a second voltage for an electrical load, said second voltage being of a lower value than said first voltage;
- a constant voltage converting means connected between said second power supply and said first controller for controlling the voltage supplied to said second power supply such that said second power supply supplies said second voltage for said electrical load constantly; and
- a second controlling means connected to said constant voltage converting means for switching on or off said constant voltage converting means and causing said first controller to operate said motor in said drive, regeneration, or power generation mode.

16. A vehicle drive device comprising an engine and a motor linked to the drive axle of the engine, characterized in that a commonly used 12-V battery is connected in series to an ultracapacitor or a low-capacity battery of a different type, allowing electrical components having two different supply voltages to be powered with a single battery comprising a 12-V or higher main power supply, and that the 12-V battery unit for common electrical equipment is charged via two routes, one of which goes through the main battery, and the other leads from the DC/DC converter.

17. A system as set forth in claim 16, characterized in that the motor is stopped, started, and regenerated in a controlled manner by the cooperative control of the DC/DC converter and the motor controller in accordance with the battery condition, and that starting can be accomplished by common external powering (12-V battery, alternator) when the main battery has deteriorated or expired, dispensing with the need to provide a separate 14-V starter to a vehicle drive device in which a motor rated to a main supply voltage of 14 V or higher provides the starter function.

* * * * *